United States Patent Office 3,470,605
Patented Oct. 7, 1969

3,470,605
MANUFACTURE OF STEEL TUBES
Helmut Benteler, Bielefeld, and Heinz Menne, Paderborn, Germany, assignors to Firma Benteler Werke, A.G., Neuhaus, Kreis, Paderborn, Germany
Filed Nov. 3, 1966, Ser. No. 591,873
Claims priority, application Germany, Nov. 3, 1965, B 84,352
Int. Cl. B23k 31/06, 35/24
U.S. Cl. 29—498     5 Claims

ABSTRACT OF THE DISCLOSURE

The invention relates to the manufacture of steel tubes in an oxygen-free atmosphere, the tubes comprising a strip of material wound into at least two layers. These layers are united, without solder, by heating them to a temperature in the range between the solidus line and the liquidus line.

---

Figure 1:
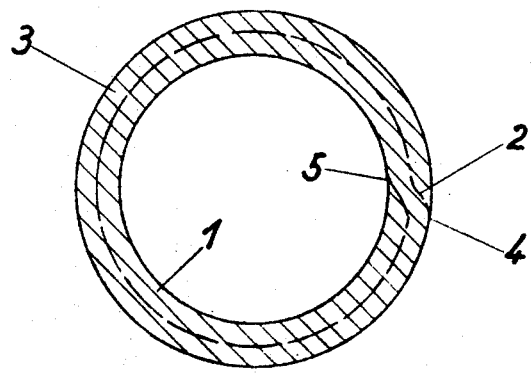

It is known to take steel strip, which is to be wound into layers in this manner and to provide it beforehand with a coating of solder on one or both sides, in particular a coating of copper or zinc, and then to join the layers together by the action of heat after the winding operation. It is also known to carry out this heating step in an oxygen-free atmosphere. Multi-layer steel tubes made in this way have found wide use, in particular in those situations where the tube is to resist high internal pressures, such as for example in hydraulic brake pipes for the braking systems of motor vehicles.

The above-mentioned application of coatings of solder to the steel strip is troublesome and expensive. Moreover the provision of this coating only allows the layers to be soldered together, not actually welded, and so the homogeneity of the steel body is interrupted by the resulting interface. The presence of the intermediate layer of solder also limits the range of use of the multi-layer steel tube in question to so-called intermediate-temperature tubing. It cannot be employed as high-temperature pressure tubing because an upper limit is set by the softening of the solder material.

The above-mentioned disadvantages are overcome in the manufacture of steel tubes in an oxygen-free atmosphere from strip material wound into at least two layers, in that according to the invention the layers are united without solder solely by heating to a temperature in the softening range between the solidus line and the liquidus line, at which temperature the adjacent layers become fused together. The solidus line and the liquidus line will, of course, depend on the composition of the particular steel being used. As is well known, alloying elements, particularly carbon, will change the position of these lines substantially. A great many types of steel may be employed according to the practice of this invention as described hereinafter. To mention a particular example, the welding of the unalloyed low carbon steel St 35 having a carbon content of 0.07 to 0.16% is carried out at a temperature range between 1487° C. and about 1515° C. It should be noted, however, that the position of the liquidus line will be influenced by the heating velocity. In such manufacture and naturally also in the products of it, the result of the fusing operation is a completely homogeneous steel body, even at the interfaces, so that the strength of the tube produced in this way is substantially higher than that of the known tubes having intermediate solder layers. The omission of such layers of solder also has the result that not only low-carbon unalloyed steels can be used, but also high-carbon and low-alloy or high-alloy steels can be used without detracting from their qualities. In general all carbon structural steels and low and high alloy structural steels may be employed in the present invention. Among these there may be mentioned, for example, the plain carbon steels St 35, St 45, St 55, St 65; the carbon case hardening steels and heat treatable steels C 10, C 15, C 22, C 35, C 45; the low alloy boiler steels 15 Mo 3, 13 CrMo 44, 10 CrMo 9, 10; the high alloy austenitic chrome-nickel steels; and the high alloy ferritic chrome steels.

According to a preferred feature of the invention, the surfaces of the layers to be joined are alloyed with a component which lowers the bottom temperature limit of the softening range. Components which will lower the bottom temperature limit of the softening range include e.g. carbon, silicon, manganese and nickel. This allows the invention to be applied even to tubes of large diameter but small wall thickness, in that a sufficient stiffness of the tube material is retained even during the heat-softening step. The dimensions of the final tube produced according to the process of this invention may vary substantially, for example from 0.2 mm. to 3.5 mm. for the thickness of the tube wall and from 2 mm. to 100 mm. for the outer tube diameter. The preferred range is a tube having a wall thickness of 2.5 mm. and an outer diameter below 20 mm.

According to a further feature of the invention the heat can be obtained by induction heating. The resulting condition by which the maximum heating occurs within a predetermined zone of the tube allows the temperature gradients within the layers to be joined to be localised as desired.

According to a further feature of the invention the layers fused together by the heat treatment can be quenched to bring the fusion process immediately to a stop. This allows the retention of the dimensions to control the final tube shape.

Finally, according to another feature of the invention, a subsequent heat treatment is desirable when it is necessary to eliminate the presence of any overheated grain structure. The resulting increase in the ductility of the tube is an advantage in most fields of use. In conducting the heat treatment the tube is heated to a temperature above the $Ac_3$ point and subsequently cooled fairly quickly depending on the type of steel. In the case of austenitic steels rapid cooling from about 1100 to 1200° C. should be effected. Heat treatable steels should be hardened after welding and subsequently tempered.

Further features of the invention are explained in the following description in conjunction with the drawings, which illustrate two embodiments of steel tube produced by the method stated. In particular FIGURE 1 relates to the manufacture of a two-layer steel tube and FIGURE 2 to the manufacture of a three-layer tube.

Referring to FIGURE 1, a steel strip having no coating of solder is first wound to form the inner ring 1 and then, guiding it closely against this ring over the transition point 2, the outer ring 3 is wound still in close contact with the inner ring 1. The alignment of the free ends 4 and 5 is taken care of by appropriate selection of the width of the strip before winding so that two layers 1 and 3 are produced, in tight mutual contact. This combination of layers is subjected to the action of heat in an oxygen-free atmosphere so that in the softening range between the solidus line and the liquidus line a junction is produced between the layers such that a homogeneous body is produced even at the interfaces between the layers, so that these interfaces themselves completely vanish. Tests have shown that the fusion takes place without noticeable distortion of the shape of the layered body.

Figure 2:
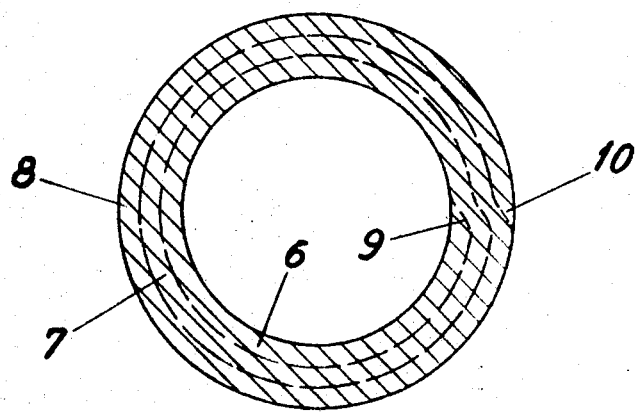

Referring to FIGURE 2, the three layers 6, 7 and 8 of a steel strip, which again has no solder coating, are in close contact with one another and again the start 9 and the end 10 of the strip are aligned. Here again the joining of the layers is achieved solely by heating in an oxygen-free atmosphere to a temperature in the softening range between the solidus line and the liquidus line, without any substantial externally applied pressure. After the manufacture of such a homogeneous combination of layers the resulting multi-layer tube again shows no noticeable distortion of its shape.

The broken line in FIGURES 1 and 2 are intended to indicate the interfaces between the layers before the heating and at the same time to indicate that the material of the layers becomes fused at these interfaces so that no such interface remains after the heating. The resulting homogeneous body has the above-mentioned high strength and rigidity, i.e. those properties which are deficient in normal seamless tubes since, as is well known, normal seamless drawn tubes leave something to be desired as far as uniformity of wall thickness is concerned, this draw-back being a characteristic of their manufacture. A further advantage of the tube manufactured by the process according to the invention over known seamless tubing is that the inner surface is flawless and indeed capable of being inspected, which is not the case in normal seamless tubing, in particular that of small diameter.

What we claim is:

1. In the method of manufacturing steel tubes in an oxygen-free atmosphere from strip material wound into at least two layers, the improvement comprising the steps of uniting the layers without solder, solely by heating to a temperature in the softening range between the solidus line and the liquidus line, at which temperature the adjacent layers become fused together.

2. A method of manufacturing steel tubes according to claim 1, in which the surfaces of the layers to be joined are alloyed with a component which lowers the bottom temperature of the softening range.

3. A method of manufacturing steel tubes according to claim 1, in which the heating is induction heating.

4. A method of manufacturing steel tubes according to claim 1, in which the layers, fused together by the heat, are subsequently quenched.

5. A method of manufacturing steel tubes according to claim 1, in which the tube is subjected to a subsequent heat treatment to eliminate overheating grain structure.

References Cited
UNITED STATES PATENTS

| | | | |
|---|---|---|---|
| 1,012,968 | 12/1911 | Bartz | 29—486 |
| 2,104,884 | 1/1938 | Quarnstrom | 29—476 X |
| 2,380,107 | 7/1945 | Hobrock | 29—476 X |
| 2,866,480 | 12/1958 | Snively | 29—476 X |
| 2,996,799 | 8/1961 | Gaul | 29—476 |
| 3,083,452 | 4/1963 | Terrill et al. | 29—486 X |

JOHN F. CAMPBELL, Primary Examiner

J. L. CLINE, Assistant Examiner

U.S. Cl. X.R.

29—476.5, 487